W. Rider,

Horse Power.

Nº 20,978.  Patented July 20, 1858.

UNITED STATES PATENT OFFICE.

W. RIDER, OF ALMONT, MICHIGAN, ASSIGNOR TO HIMSELF AND J. B. SWEETLAND, OF SAME PLACE.

HORSE-POWER.

Specification of Letters Patent No. 20,978, dated July 20, 1858.

*To all whom it may concern:*

Be it known that I, WILLIAM RIDER, of Almont, in the county of Lapeer and State of Michigan, have invented a new and Improved Horse-Power; and I do hereby declare that the following is a full, clear, and exact description of the same, reference being had to the accompanying drawings, making a part of this specification, in which—

Figure 1:
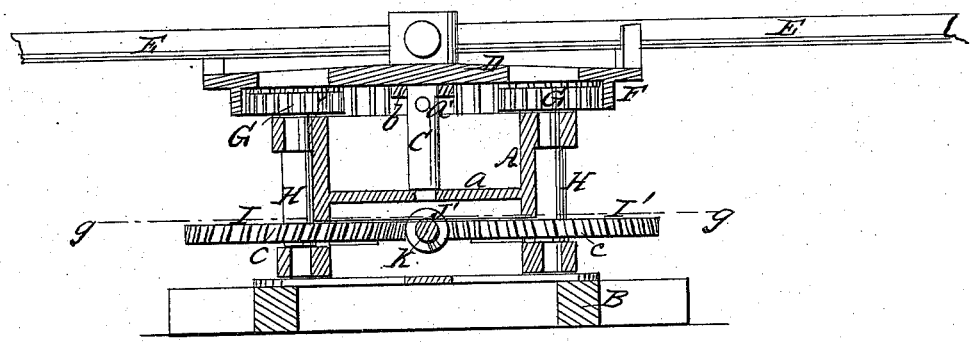
Figure 2:
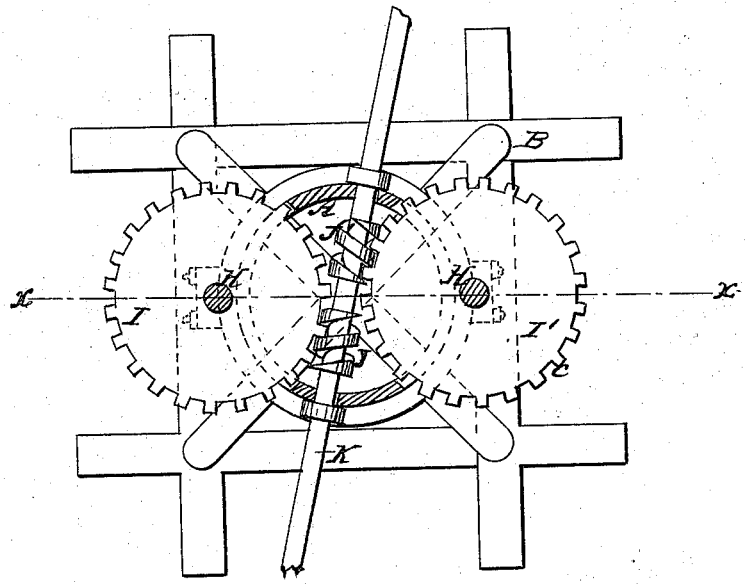

Figure 1, is a vertical section of my improvement taken in the line $x$, $x$, of Fig. 2. Fig. 2, is a horizontal section of the same, taken in the line $y$, $y$, of Fig. 1.

Similar letters of reference indicate corresponding parts in the two figures.

This invention consists in having a right and left screw placed on the shaft from which the power is taken and arranged with worm wheels and driving gear as hereinafter shown, whereby a simple device is obtained and the requisite degree of speed transmitted from the driving shaft to that from which the power is taken with the least possible amount of friction.

To enable those skilled in the art to fully understand and construct my invention, I will proceed to describe it.

A represents a cylindrical hollow case or support, which is permanently secured to a proper base B; and C is a shaft which is placed vertically and centrally within the case A, the lower end of the shaft C being stepped in a crosspiece $a$, in the case, and the upper part of the shaft having its bearing in a crosspiece $b$. Through the shaft C, and just below the upper crosspiece $b$, a pin $a'$ passes.

On the upper end of the shaft C, a wheel D is placed, to which one or more sweeps E are attached. The under side of the wheel D has an annular geared rim F formed on it, and this rim F gears into two pinions G, G, which are placed on the upper ends of shafts H, H, said shafts being at the outer side of the case A, and having their bearings at the upper and lower parts of the case, as shown clearly in Fig. 1.

On the lower part of the shafts H, H, there are placed worm wheels I, I', a wheel on each shaft H. These wheels project through slots or openings in the case A, and gear respectively with screws J, J', which are placed on a shaft K, said shaft having its bearings in the case A.

The screws J, J', have reverse threads, or as it is commonly termed, one is a right and the other a left screw. The worm wheels I, I', have their teeth $c$ also in reverse positions, corresponding to those of their respective screws.

The horses one or more are attached to the sweeps E, E, and the wheel D rotated; and the geared rim F, and pinions G, G, rotate the shafts H, H, and consequently the wheels I, I', and as these wheels of course rotate in reverse directions, the screws J, J', must necessarily be reversed in order that the wheels I, I', may rotate the shaft K, from which the power is taken.

By this arrangement of the two screws and worm wheels, the shaft K, is rotated with but little friction, as there will be no lateral pressure on its bearings, as there is a wheel at each side of the shaft, and the pressure exerted against the shaft K, by one wheel is neutralized by that exerted against it by the opposite wheel.

I do not claim, broadly, a worm wheel and screw, as that is a well known mechanical device. But

I claim as new and desire to secure by Letters Patent—

The arrangement and combination as herein shown and described of the right and left screws J, J', placed on the shaft K, in connection with the worm wheels I, I', which gear into the screws J, J', and are rotated from the driving wheel D, by means of the gearing F, G, G.

WM. RIDER.

Witnesses:
JOHN RATTRAY,
J. N. HARRIS.